(12) United States Patent
Smith

(10) Patent No.: US 11,187,591 B2
(45) Date of Patent: Nov. 30, 2021

(54) TEMPERATURE TESTING APPARATUS

(71) Applicant: Sean Ronald Smith, Yorkshire (GB)

(72) Inventor: Sean Ronald Smith, Yorkshire (GB)

( * ) Notice: Subject to any disclaimer, the term of this patent is extended or adjusted under 35 U.S.C. 154(b) by 173 days.

(21) Appl. No.: 16/469,021

(22) PCT Filed: Dec. 12, 2017

(86) PCT No.: PCT/GB2017/053719
§ 371 (c)(1),
(2) Date: Jun. 12, 2019

(87) PCT Pub. No.: WO2018/109458
PCT Pub. Date: Jun. 21, 2018

(65) Prior Publication Data
US 2020/0080899 A1  Mar. 12, 2020

(30) Foreign Application Priority Data
Dec. 12, 2016 (GB) ..................................... 1621093

(51) Int. Cl.
*G01K 1/08* (2021.01)
*G01K 13/00* (2021.01)
(52) U.S. Cl.
CPC ............... *G01K 1/08* (2013.01); *G01K 13/00* (2013.01); *G01K 2207/02* (2013.01)

(58) Field of Classification Search
None
See application file for complete search history.

(56) References Cited

U.S. PATENT DOCUMENTS

| 3,785,208 A | 1/1974 | Marsilia et al. | |
| 2010/0094111 A1* | 4/2010 | Heller | G01N 27/3274 |
| | | | 600/345 |
| 2011/0200655 A1* | 8/2011 | Black | A01N 25/34 |
| | | | 424/404 |
| 2012/0225170 A1 | 9/2012 | Sonnendorfer | |

FOREIGN PATENT DOCUMENTS

| WO | WO2015/077748 | 5/2015 | |
| WO | WO-2016058616 A1 * | 4/2016 | ............. G01K 1/026 |

* cited by examiner

*Primary Examiner* — Erica S Lin
(74) *Attorney, Agent, or Firm* — Keith Miller Patent Law; Keith Miller

(57) ABSTRACT

The invention relates to the provision of apparatus for use in measuring the temperature of a body of matter and in particular the temperature of a foodstuff in a manner which allows the required apparatus in the form of a housing with data processing means and a temperature probe connected thereto, to be used effectively and without the apparatus itself becoming a safety hazard. This is achieved by using materials which are provided in a form to allow the apparatus, and portions thereof to be rendered detectable by metal detection and/or X-ray detection apparatus.

12 Claims, 2 Drawing Sheets

TEMPERATURE TESTING APPARATUS

Figure 1:
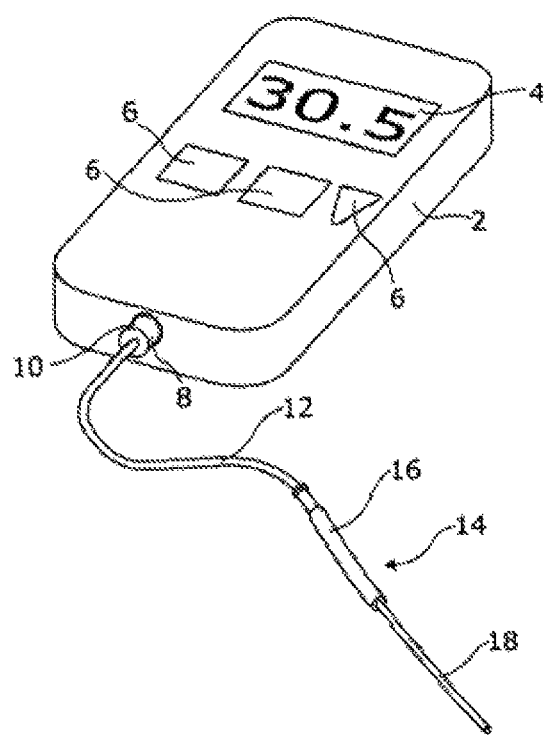

The invention to which this application relates is apparatus of a type which can be used to test and monitor the temperature of a material. Particularly, although not necessarily exclusively, the invention to which this apparatus is related, is for use in testing the temperature of foodstuffs. The testing of the temperature of foodstuffs is a common occurrence and in many cases is legally required and/or advisable in order to ensure that the foodstuff is fit for consumption and/or is being stored correctly.

There are many different scenarios in which the testing of the temperature of the foodstuff is required and these include the following;

when a foodstuff has been cooked and is then being held at a temperature,—this is typically required when, for example, a hot buffet is made available for a period of time and during which customers can select to take a quantity of the foodstuff and then consume the same. In order for the foodstuff to be fit for consumption it is imperative that the foodstuff is stored at or above a particular temperature for the period of time for which the same is available.

Another potential reason to monitor the temperature is if the foodstuff has been cooked and is then required to be chilled and/or frozen for storage before the same is due to be consumed, in which case it is necessary to ensure that the temperature of the cooked foodstuff has reduced to a sufficiently low level before the same is chilled or frozen.

Another possible scenario is during the cooking of the foodstuff to ensure that the foodstuff has reached a required temperature for the same to then be fit for consumption.

Another possible scenario is during the storage of chilled or frozen products, such as ice-cream, to ensure that the product is sufficiently cold so as to prevent contamination of the same.

It should be noted that the above examples are not exhaustive and that there are many different scenarios where the temperature of foodstuffs is required to be taken, and taken at relatively regular times. Also, it is not sufficient for the surface of the foodstuff to be tested, it is required that the internal temperature of the body of the foodstuff is taken. This is conventionally achieved by the use of a temperature monitoring control means which includes a housing which includes integrally therewith, or is connected by a cable or alternatively wirelessly, a probe. The probe is provided to be gripped and inserted into the foodstuff of which the temperature is to be tested. An elongate portion of the probe which is inserted into the foodstuff is typically provided with means to allow the temperature to be monitored and this is electrically connected to the housing which includes processing means to receive a signal from the elongate portion of the probe which is indicative of the measured temperature so as to allow a temperature value to be displayed on a display screen on the housing and/or saved in memory in the housing and/or transmitted for further processing at a remote location.

In order to obtain the temperature reading, the free end of the probe is located within the foodstuff and thereby provide an indication of the temperature of the interior of the foodstuff. It may be required, in order to provide an average temperature, to insert the probe into the body of foodstuff at different locations.

It will therefore be appreciated that the probe elongate portion which is typically formed of metal, is detectable if the same was to become detached from the remainder of the apparatus and remain in the foodstuff. However the remainder of the apparatus, in the form of the remainder of the probe, cable connection, housing and portions thereof such as the display screen, are typically made of a plastics material. This means that apparatus as a whole, the plastics components separately and fragments thereof, all represent a potential hazard if they are inadvertently retained in or on the foodstuff as the presence of the same cannot be detected other than perhaps, visually. This could cause injury, or worse to the end consumer.

An aim of the present invention is therefore to allow the temperature monitoring apparatus to be provided in a form which allows the same to be used to provide the temperature monitoring of a material, such as a foodstuff, in a reliable manner whilst, at the same time, allowing the presence of substantially all, and preferably all components of the apparatus to be rendered detectable when on or within the said body of material so as to avoid the same being a potential hazard, if undetected.

In a first aspect of the invention, there is provided temperature monitoring apparatus including a housing with control means and data processing means located therein and a probe including a body connected with an elongate member for insertion into a body of matter of which the temperature is to be detected, said probe connected to allow data indicative of the temperature to be passed to the said data processing means in the housing and wherein the said apparatus housing and probe are substantially formed of a material which is detectable by at least one of metal detection and/or x-ray detection apparatus.

In one embodiment, the elongate member of the probe is formed of metal which is detectable by the metal detection apparatus and the housing and the remainder of the probe is formed of a polymer material which includes metal particles in a sufficient quantity so as to render the same detectable by metal detection apparatus and/or barium so as to render the polymer sufficiently dense as to be detected by X-ray detection apparatus.

In one embodiment, the metal particles and barium, are located within the polymer during the formation of the polymer with the metal particles and barium are added and mixed and dispersed therewith so as to extend substantially throughout the polymer material thereby ensuring, that when the polymer material is subsequently used to form the components of the temperature monitoring apparatus the metal particles and/or barium are dispersed throughout the material thereby rendering the components and fragments or portions thereof which may be separated from the components during use, detectable.

In one embodiment, the probe is formed by the elongate member and the body which is used as a gripping portion for use of the probe and is formed of the polymer material. Typically the said body and elongate member are formed separately and then joined together to form the probe.

In one embodiment the apparatus is for use in the food industry to detect the temperature of a foodstuff by insertion of the elongate member into the foodstuff. Typically the apparatus is required to be used at regular intervals during the provision of said foodstuff for consumption.

In one embodiment the housing includes display means to indicate the detected temperature of the body of matter in which the same is inserted at that time.

Typically the probe is connected to the housing via a wired connection, or alternatively wirelessly.

In one embodiment the polymer used to form the apparatus is also processed to antimicrobial product protection.

Figure 2:
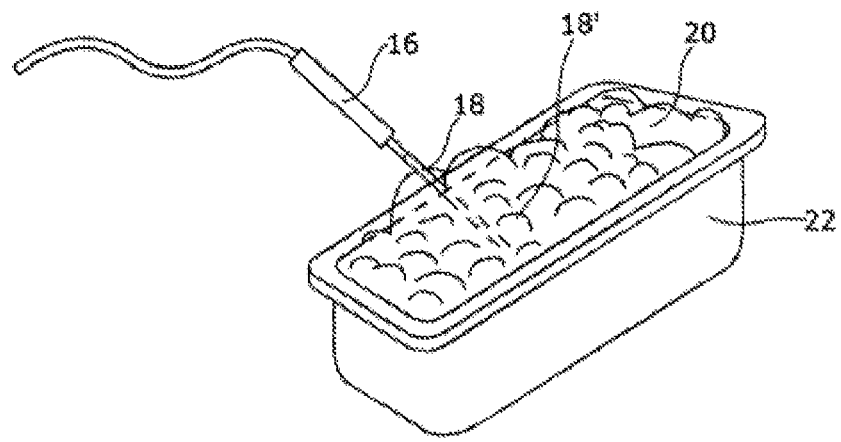
Figure 3:
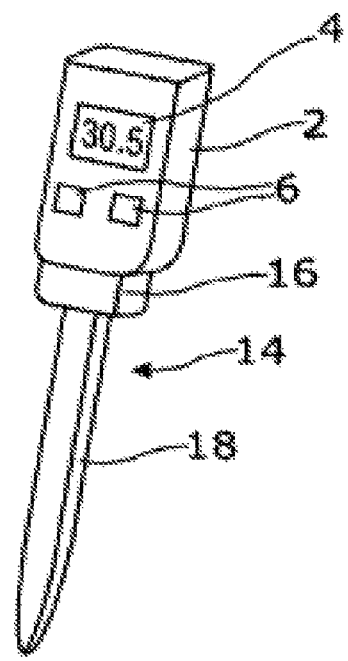

A specific embodiment of the invention is now described with reference to the accompanying drawings; wherein FIG. 1 illustrates an example of temperature monitoring apparatus in accordance with one embodiment of the invention;

FIG. 2 illustrates the probe in use with a foodstuff in accordance with one embodiment of the invention; and FIG. 3 illustrates a further embodiment of apparatus in accordance with the invention.

Referring now to FIGS. 1 and 2 there is illustrated temperature monitoring apparatus in accordance with one embodiment of the invention. However it should be appreciated that this is only one example and the inventive concept can be used in any form of temperature monitoring apparatus of this general type, to advantage. For example, in certain embodiments the housing can be provided as an integral part of the body from which the elongate member protrudes so that the housing and probe are provided integrally as illustrated in FIG. 3 and for which the same reference numerals are used for the same components as shown in FIGS. 1 and 2.

The apparatus in this embodiment includes a housing 2 on which there are provided a number of components fitted therewith, including a display screen 4 on which the monitored temperature is detected, control buttons 6 to allow functions to be selected i.e. on/off, Fahrenheit/Celsius, monitoring sensitivity and/or other user selections to be made. A connection means 8 is also provided for receipt of connector plug 10 connected to a cable 12 of a probe 14. The probe is provided with a body having a gripping portion 16 and a metal elongate portion 18 and it is this elongate portion which is provided to be inserted into the foodstuff in order for the temperature of the same to be monitored and signals indicative of the temperature passed back via the cable 12 to data processing means provided in the housing which then allow the temperature to be displayed on the display screen 4. In other embodiments the probe may be provided integrally with the housing and without the need for the cable to be provided or may be connected to transmit data wirelessly via a transmitter/receiver provided in the probe body and a transceiver provided in the housing. The data processing means provided within the housing may be of any conventional type which allow the temperature readings from the elongate member portion 18 to be converted into a the temperature display format.

FIG. 2 illustrates the manner in which the free end 18'elongate member portion 18, when the apparatus is in use, is inserted into a body of foodstuff 20, which in this embodiment is in a container 22, for which foodstuff, the temperature is to be tested. After a period of time, the data for the temperature detected by the elongate portion 18 in the foodstuff will indicate a substantially constant temperature value for the foodstuff and the user can then determine whether that is suitable temperature for storage, or for the foodstuff to be cooked etc. Particularly when the foodstuff is being stored or is on display for ongoing consumption, the user is required to use the apparatus at regular intervals and so it will be appreciated that each time of use represents an opportunity for part of the apparatus to break or fragment and hence be left in or on the foodstuff without the user being aware. In accordance with the invention, the foodstuff can be further checked using metal detection and/or X-ray detection apparatus and any fragments of the temperature checking apparatus which are present will be detected and, if there is a detection, the foodstuff can be removed, so preventing any hazard being presented to the potential consumer of the foodstuff.

In FIG. 3 it is shown that the body 16 and housing 2 are provided in combination and the probe 18 extends from the housing 2/body 16 directly without the need for a cable connection 12 or plug and socket connection 8,10.

As all of the apparatus is used in the vicinity of the foodstuff, all of the components represent a hazard should all, or a fragment of the same, fall into and be left undetected in the foodstuff. This is due to the fact that conventionally there is no possibility of the probe body or housing, or fragments thereof, being detected in the foodstuff other than visually, which is high throughput food processing apparatus, is extremely unlikely. This means that conventionally the fragments would still be present at the time of consumption of the foodstuff.

This risk is substantially reduced in accordance with the invention as at least the outer surface components of the apparatus are manufactured from a detectable polymer or detectable metal or metal alloy, as are those components which are regarded as capable of being separated from the remainder of the apparatus. The polymer is rendered detectable by the inclusion and dispersal therein of sufficient detectable metal particles throughout the polymer and/or barium dispersed in the polymer so as to render the polymer, and hence the components manufactured therefrom such as the housing and probe body, metal detectable and/or x-ray detectable.

This therefore allows the foodstuff to be tested using suitable detection apparatus, possibly provided as part of the temperature monitoring apparatus, but more likely separately thereto, prior to the foodstuff being made available for consumption and so any fragments of apparatus would be detected prior to the foodstuff being made available and the potential hazard is avoided.

In one embodiment the polymer which is used can be a first polymer which is non-detectable which is mixed with a further polymer in which the metal particles and/or barium is included. In one embodiment the said further polymer may comprise in the range of 15-30% of the combined polymer material which is mixed in the fluid state and then used in a conventional manner to be moulded to form the component parts of the apparatus. In one embodiment the said further polymer material includes in the range of 10-20% metal particles and/or 42-47% barium.

This in accordance with the invention the apparatus which is used to determine the safety of foodstuff for consumption by measuring the temperature of the same is prevented from itself being a potential hazard to the subsequent consumer of the foodstuff.

I claim:

1. A temperature monitoring apparatus comprising:
a housing comprising a control means and a data processing means located therein; and
a probe connected to the housing and comprising an elongate member configured for insertion into a body of matter of which a temperature is to be detected;
wherein the probe is configured to allow data indicative of the temperature to be passed to the data processing means in the housing,
wherein the housing and at least a portion of the probe are substantially formed of a polymer blend comprising a mixture of a first polymer and a second polymer,
wherein the second polymer comprises at least one of a plurality of metal particles or barium that was added to a beginning polymer during a formation of the second polymer by adding and mixing the at least one of the plurality of metal particles or barium while the beginning polymer comprised a substantially fluid state so the at least one of the plurality of metal particles or barium dispersed throughout the beginning polymer, wherein the second polymer comprises about 15-30% of the total polymer blend that forms the housing and the at least a portion of the probe, wherein about 42-47% of the second polymer comprises barium; and wherein the first polymer is undetectable by a metal detection apparatus and an x-ray detection apparatus and the second polymer is detectable by at least one of the metal detection apparatus and the x-ray detection apparatus.

2. The temperature monitoring apparatus according to claim 1, wherein the probe further comprises a gripping portion configured to be gripped by a user during use of the probe.

3. The temperature monitoring apparatus according to claim 2, wherein the gripping portion and the elongate member are formed as separate components and then joined together to form the probe.

4. The temperature monitoring apparatus according to claim 1, wherein the body of matter is a foodstuff and the temperature monitoring apparatus is configured for use in the food industry to detect the temperature of the foodstuff by insertion of the elongate member into the foodstuff.

5. The temperature monitoring apparatus according to claim 4, wherein the control means is configured to remind a user to measure the temperature of the foodstuff at regular intervals during the preparation of the foodstuff for consumption.

6. The temperature monitoring apparatus according to claim 1, wherein the housing comprises a display screen configured to indicate the detected temperature of the body of matter in which the probe is inserted at that time.

7. The temperature monitoring apparatus according to claim 1, wherein the probe is connected to the housing by a wire configured to allow a data transfer between the probe and the housing where the data processing means is configured to convert the data into the temperature reading displayed on a display screen on the housing.

8. The temperature monitoring apparatus according to claim 1, wherein the data is transferred between the probe and the data processing means wirelessly.

9. The temperature monitoring apparatus according to claim 1, wherein the probe is integral to the housing.

10. The temperature monitoring apparatus according to claim 1, wherein about 10-20% of the second polymer comprises metal particles.

11. The temperature monitoring apparatus according to claim 1, wherein the probe is connected to the housing via a wired connection.

12. The temperature monitoring apparatus according to claim 1, wherein the polymer blend comprises antimicrobial properties.

* * * * *